… … …

United States Patent Office 2,979,435
Patented Apr. 11, 1961

---

2,979,435

ETHYLENE-SULFONYL FUNGICIDES

Maynard S. Raasch, Wilmington, Del., assignor to E. I. du Pont de Nemours and Company, Wilmington, Del., a corporation of Delaware No Drawing. Filed Mar. 13, 1957, Ser. No. 645,665

6 Claims. (Cl. 167—22)

This invention relates to fungicidal compositions and methods.

More particularly, the present invention is directed to fungicidal formulations for seeds, plants and soil employing as essential active ingredients substituted vinylene disulfones and disulfoxides of the formula (1) 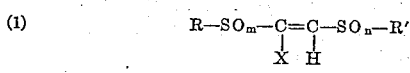

wherein R and R' are the same or different alkyl radicals; the indicated oxygen atoms are joined only to the indicated sulfur atoms, which sulfur atoms otherwise are attached only to carbon atoms; $m$ and $n$ are positive whole numbers not greater than 2, that is, 1 or 2; and X represents halogen, that is, fluorine, chlorine, bromine or iodine.

This application is a continuation-in-part of my copending U.S. application, Serial No. 539,948, filed October 11, 1955, now abandoned.

In the preferred fungicidal compositions and methods of my invention, I employ as an active ingredient a compound of the above formula in which R and R' are alkyl radicals having from 1 to 6 carbon atoms. Especially preferred are compounds of the above formula where alkyl is lower alkyl, $m$ and $n$ are two, and halogen is chlorine.

The fungicidally active compounds of the above formula can be prepared by a variety of methods.

One method which is quite satisfactory consists in oxidizing a vinylene disulfide to the desired disulfoxide or sulfone. The oxidation can be carried out as fully described in my copending United States application, Serial No. 367,351, filed July 10, 1953. In brief, the oxidation can be carried out with oxidizing agents such as, for example, hydrogen peroxide, peracetic acid, chromic acid, sodium hypochlorite, benzoyl peroxide, nitric acid and potassium permanganate. Thus, the vinylene disulfide in solution in a solvent such as acetic acid can be heated with aqueous hydrogen peroxide for several hours. By controlling the reaction conditions, for example, the proportions of oxidizing agent and the temperature and time of oxidation, the disulfide can be oxidized to the disulfoxide, to a mixed sulfoxide sulfone, or to the disulfone. Specific conditions vary with the particular disulfide being oxidized.

The vinylene disulfides used as starting materials for the above described process can be made by reacting a trihaloethylene with a mercaptide, or with a mercaptan in the presence of an alkali metal hydroxide.

The fungicidally active substituted vinylene-disulfide and disulfoxides used in the compositions and methods of this invention can also be prepared by the method described by Backer et al. Rec. trav. chim. 72, 813 (1953). These methods can be illustrated by the following two equations:

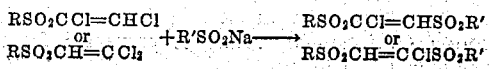

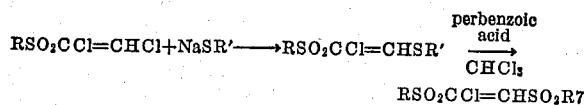

It will be understood that the fungicidally active compounds used in my novel compositions and methods can exist either as cis or trans isomers, or as mixtures thereof. In general, the trans isomers have been found to possess slightly more activity than the corresponding cis isomers.

In practicing the fungicidal methods of my invention, one or more of the active ingredients is applied to the organic material to be treated for the control of fungi at a dosage sufficient to exert fungicidal action. Accordingly, my compositions and methods are applicable for the protection of carbohydrates, proteins and fats. They are particularly suited for the treating of living plants such as vegetables, ornamental plants and fruit-bearing trees. These compositions are also effective when applied directly to the soil for controlling plant fungi. Also they can be used to treat paints and lubricating oils. They also are of value as seed-treating agents.

In the application to plants, fungicidal control is obtained in most instances by applying the active compound at a dosage or rate of from about 0.5 to 10.0 lbs. per acre. The optimum amount within this range is largely dependent upon the variables mentioned above.

For the application directly to soil for use as a systemic fungicide, in most instances, the dosage or rate is from about 1 to 75 lbs. per acre. The optimum dosage can be determined in each instance by one of the means conventional in the art. It is, of course, determined by and dependent upon the particular fungicidal compounds selected, the method of application, and, in the case of application to vegetation, the state and condition of the growth of the vegetation to be treated, and the climatic conditions.

The fungicidal compositions of the present invention contain in sufficient amount to exert fungicidal action one or more of the above-described active compounds in admixture with a carrier material or conditioning agent of the kind used and commonly referred to in the art as a fungicide adjuvant or a modifier. The conventional fungicide adjuvants are inert solids, hydrocarbon liquid diluents, and surface active agents. They provide formulations adapted for ready and efficient application using conventional applicator equipment. Usually from about 1 to 95% by weight of the fungicidal composition is active ingredient.

Solid compositions are preferably in the form of powders. They are compounded to the homogeneous powders that either can be used as such, diluted with inert solids to form dusts, or suspended in a suitable liquid medium for spray application. The powders usually comprise active ingredient admixed with minor amounts of a conditioning agent.

Natural clays, either absorptive such as attapulgite or relatively non-absorptive such as china clays, diatomaceous earth, walnut shell flour, redwood flour, synthetic fine silica, calcium silicate and other inert solid carriers of the kind conventionally employed in powder fungicidal compositions can be used. The active ingredient usually makes up from about 25 to 90% of these powder compositions. For conversion of the powders to dusts, talc, pyrophyllite, tobacco dust, volcanic ash and other dense rapid-settling inert solids customarily are used.

Liquid compositions employing one or more of the fungicidally active ingredients are prepared by admixing the active ingredients with a suitable liquid diluent medium. The active ingredients can be either in solution or in suspension in the liquid medium. Typical of the liquid media commonly employed as fungicidal adjuvant are kerosene, Stoddard solvent, xylene, alcohols, alkylated naphthalenes and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Sanitary Chemicals," August, September and October, 1949.

In order that the invention may be better understood, the following examples are given in addition to those already set forth above:

*Example 1*

Trans 1,2 - bis(methylsulfonyl) - 1 - chloroethylene is formulated into a fungicidal composition having the following ingredients:

20% trans 1,2-bis(methylsulfonyl)-1-chloroethylene
80% ground tobacco

The components are blended together and passed through a micropulverizer.

This dust formulation when tumbled with wheat seed at a rate of 1–2 oz. of active material per 100 lbs. of seed is effective in controlling fungus growth on the seed.

*Example 2*

A fungicidal composition containing 40% cis 1,2-bis-(methylsulfonyl)-1-chloroethylene and 60% ethylene chloride when applied to lumber is effective in controlling the attack of fungi on the treated wood.

*Example 3*

The fungicidal composition of this example contains the following ingredients:

40% cis 1,2-bis(ethylsulfonyl)-1-chloroethylene
60% xylene

The active compound is dissolved in the xylene and the solution mixed until homogeneous. The resulting oil solution on addition to an oil-based paint, as a rate of 0.1 oz. active material per gallon of paint, will control the attack of fungi.

*Example 4*

Trans 1,2-bis-(n-propylsulfonyl)-1-chloroethylene is dissolved in acetone to give a 10% solution. This acetone solution when sprayed on cotton fabric prevents the growth of fungus on the fabric.

*Example 5*

Trans 1,2-bis-(n-butylsulfonyl) - 1 - chloroethylene is formulated into a fungicidal composition of the following ingredients:

80% 1,2-bis-(n-butylsulfonyl)-1-chloroethylene
0.75% alkyl naphthalene sulfonic acid sodium salt
0.25% low viscosity methyl cellulose
19% attapulgite The components are blended together and passed twice through a micropulverizer.

This wettable powder when dispersed in water to give an aqueous suspension and applied to seed corn at the rate of 0.5–1.0 oz. of active material per 100 lbs. of seed is effective in controlling fungus growth on the seed. In addition, when the wettable powder is dispersed in water and applied to infested soil at the rate of 50 pounds to the acre and mixed with the soil, the sore shin disease of cotton (*Rhizoctonia solani*) is prevented from occurring in cotton seedlings.

*Example 6*

Cis 1,2-bis(ethylsulfonyl)-1-bromoethylene is dissolved in ethylene chloride and the solution mixed until homogeneous to give a fungicidal composition of the following ingredients:

15% cis 1,2-bis(ethylsulfonyl)-1-bromoethylene
85% ethylene chloride

This oil solution on addition to an oil-based paint, at a rate of 0.1 oz. of active material per gallon of paint, is effective in controlling the attack of fungi.

*Example 7*

Cis 1,2-bis(ethylsulfonyl)-1-fluoroethylene is formulated into a fungicidal composition of the following ingredients:

40% cis 1,2-bis(ethylsulfonyl)-1-fluoroethylene
0.75% alkyl naphthalene sulfonic acid sodium salt
0.25% low viscosity methyl cellulose
59% silica The four components are blended together and passed twice through a micropulverizer.

This wettable powder when diluted with water and applied to tomato plants at the rate of 4–5 lbs. of active material per 100 gallons per acre is effective in preventing tomato early blight (*Alternaria solani*).

*Example 8*

Trans 1-(ethylsulfonyl)-2-(n-propylsulfonyl)-1-chloroethylene is formulated into a fungicidal composition having 20% trans 1-(ethylsulfonyl)-2-(n-propylsulfonyl)-1-chloroethylene and 80% ground tobacco. The two components are blended together and passed through a micropulverizer. Such a dust formulation when applied to apple trees at the rate of 6–10 lbs. of active material per acre is effective in controlling apple scab (*Venturia inaequalis*).

*Example 9*

Cis 1 - (ethylsulfonyl)-2-(n-propylsulfonyl)-1-bromoethylene is formulated into a fungicidal composition by being dissolved in xylene and the solution mixed until homogeneous. This oil solution containing 40% cis 1-(ethylsulfonyl) - 2 - (n-propylsulfonyl)-1-chloroethylene and 60% xylene when applied to lumber is effective in preventing the attack of fungi on the treated wood.

*Example 10*

Cis 1,2 - bis(t-butylsulfonyl)-1-chloroethylene, M.P. 139–140.5° C., is formulated into a fungicidal composition of the following ingredients:

80% 1,2-bis(n-butylsulfonyl)-1-chloroethylene
0.75% alkyl naphthalene sulfonic acid sodium salt
0.25% low viscosity methyl cellulose
19% attapulgite The components are blended together and passed twice through a micropulverizer.

This wettable powder when dispersed in water to give an aqueous suspension and applied to seed corn at the rate of 0.5–1.0 oz. of active material per 100 lbs. of seed is effective in controlling fungus growth on the seed. In addition, when the wettable powder is dispersed in water and applied to infested soil at the rate of 50 pounds to the acre and mixed with the soil, the sore shin disease of cotton (*Rhizoctonia solani*) is prevented from occurring in cotton seedlings.

Example 11

Cis 1 - (t-butylsulfonyl)-2-(methylsulfonyl)-1-chloroethylene, M.P. 111–111.5° C., is formulated into a fungicidal composition of the following ingredients:

80% 1,2-bis(n-butylsulfonyl)-1-chloroethylene
0.75% alkyl naphthalene sulfonic acid sodium salt
0.25% low viscosity methyl cellulose
19% attapulgite The components are blended together and passed twice through a micropulverizer.

When this wettable powder is dispersed in water and applied to infested soil at the rate of 50 pounds to the acre and mixed with the soil, the sore shin disease of cotton (*Rhizoctonia solani*) is prevented from occurring in cotton seedlings.

Example 12

Trans - 1 - (t-butylsulfonyl) - 2 - (methylsulfonyl)-1-chloroethylene, M.P. 141–143.5° C., is formulated into a fungicidal composition of the following ingredients:

80% 1,2-bis(n-butylsulfonyl)-1-chloroethylene
0.75% alkyl naphthalene sulfonic acid sodium salt
0.25% low viscosity methyl cellulose
19% attapulgite The components are blended together and passed twice through a micropulverizer.

When this wettable powder is dispersed in water and applied to infested soil at the rate of 50 pounds to the acre and mixed with the soil, the sore shin disease of cotton (*Rhizoctonia solani*) is prevented from occurring in cotton seedlings.

The examples have illustrated the compositions and methods of the invention with certain compounds as specific active ingredients. However, the invention is generic to compositions having any mono-halogen containing sulfoethylene of Formula 1, including the cis and trans geometric isomers and mixtures thereof, as the active fungicidal ingredient. Specific examples of other compounds useful in the compositions of my invention include:

1,2-bis(methylsulfonyl)-1-bromoethylene
1,2-bis(ethylsulfonyl)-1-iodoethylene
1,2,bis(isopropylsulfonyl)-1-chloroethylene
1,2-bis(isobutylsulfonyl)-1-chloroethylene
1,2-bis(amylsulfonyl)-1-chloroethylene
1,2-bis(hexylsulfonyl)-1-chloroethylene
1,2-bis(decylsulfonyl)-1-chloroethylene
1,2-bis(dodecylsulfonyl)-1-chloroethylene

I claim:

1. A method for the prevention and destruction of fungi comprising applying to the organic material to be protected, in an amount sufficient to exert fungicidal action, a compound of the formula $$R-SO_m-C(X)=C(H)-SO_n-R'$$

wherein R and R' are alkyl radicals having from 1 to 12 carbon atoms, inclusive, m and n are positive whole numbers not greater than 2, and X is halogen.

2. A fungicidal composition comprising a carrier and, in a fungicidally effective amount, a compound of the formula $$R-SO_m-C(X)=C(H)-SO_n-R'$$

wherein R and R' are alkyl radicals having from 1 to 12 carbon atoms, inclusive, m and n are positive whole numbers not greater than 2, and X is halogen.

3. A fungicidal composition according to claim 2 containing a fungicidally inert powder as a carrier.

4. A fungicidal composition according to claim 2 containing a surface-active-dispersing agent as a carrier.

5. The method of preventing fungus attack from occurring in seedlings and plants which comprises applying, in a fungicidally effective amount, to soil in which said seedlings and plants grow, a compound of the formula $$R-SO_m-C(X)=C(H)-SO_n-R'$$

wherein R and R' are alkyl radicals having from 1 to 12 carbon atoms, inclusive, m and n are positive whole numbers not greater than 2, and X is halogen.

6. The method of protecting seeds, subject to attack by fungi, from attack thereby, which comprises treating said seeds with a fungicidally effective amount of a compound of the formula $$R-SO_m-C(X)=C(H)-SO_n-R'$$

wherein R and R' are alkyl radicals having from 1 to 12 carbon atoms, inclusive, m and n are positive whole numbers not greater than 2, and X is halogen.

References Cited in the file of this patent

UNITED STATES PATENTS

| | | |
|---|---|---|
| 2,493,364 | Schoene | Jan. 3, 1950 |
| 2,893,911 | Raasch | July 7, 1959 |

OTHER REFERENCES

Schneider: Chemische Berichte, 84, pages 911–916, (1951).

Frear: A Catalogue of Insecticides and Fungicides, vol. I (1947), page 58 Chronica Botanica Co.